Jan. 16, 1923.
B. DE MATTIA.
MACHINE FOR BUILDING CYLINDRICAL TIRE BLANKS.
FILED MAR. 9, 1920.
1,442,653.
7 SHEETS—SHEET 5.
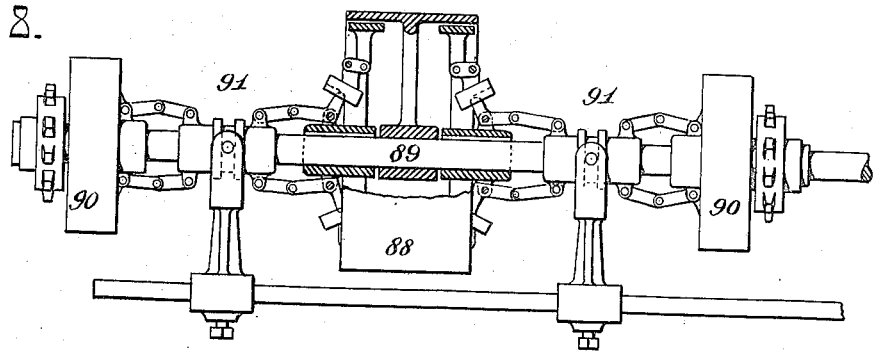
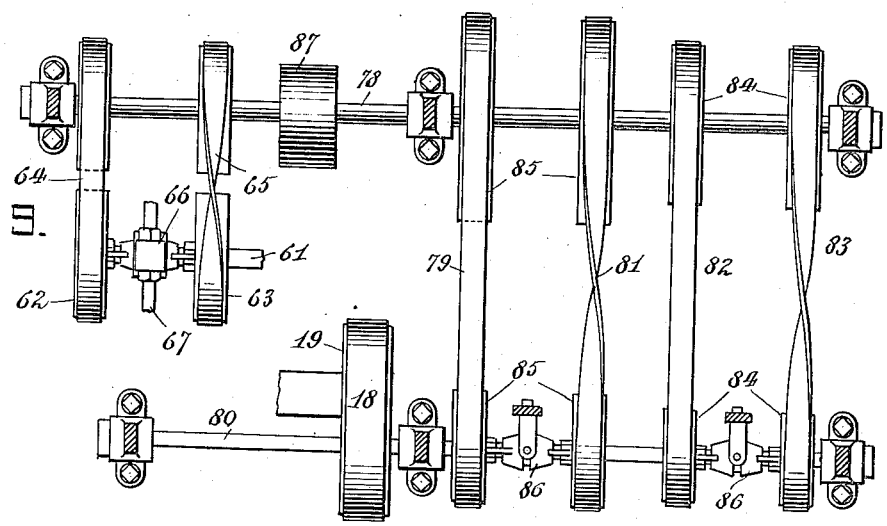
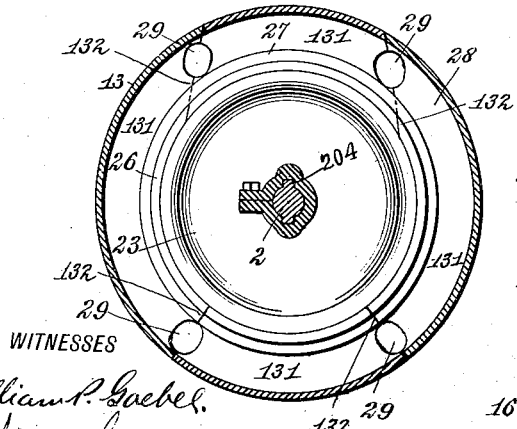
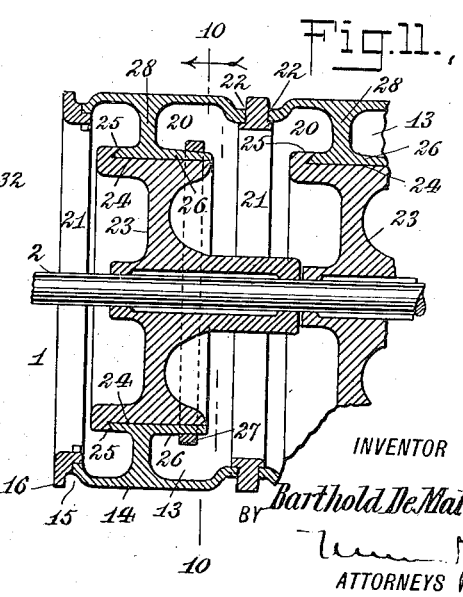
WITNESSES
INVENTOR
Barthold De Mattia
ATTORNEYS

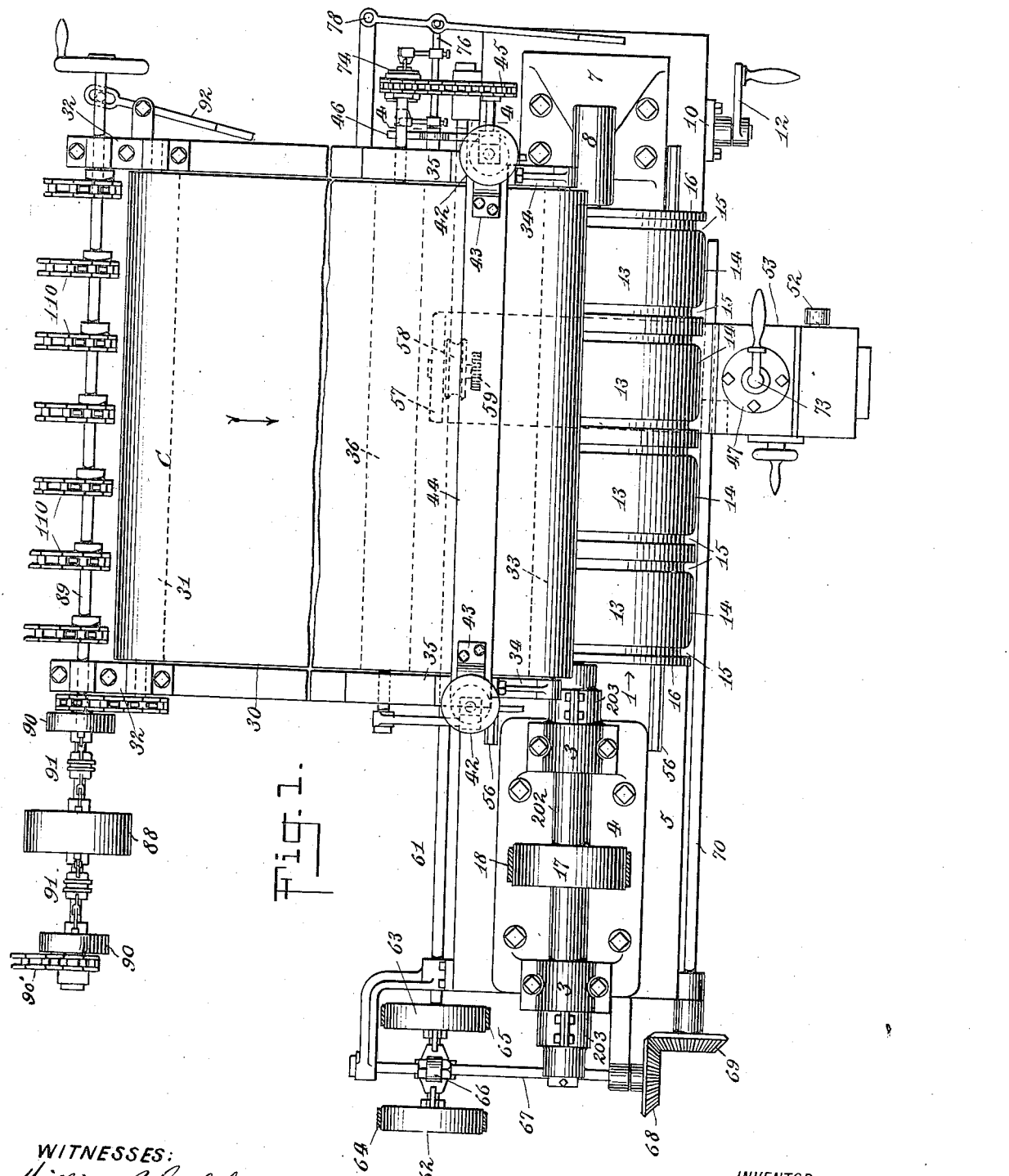

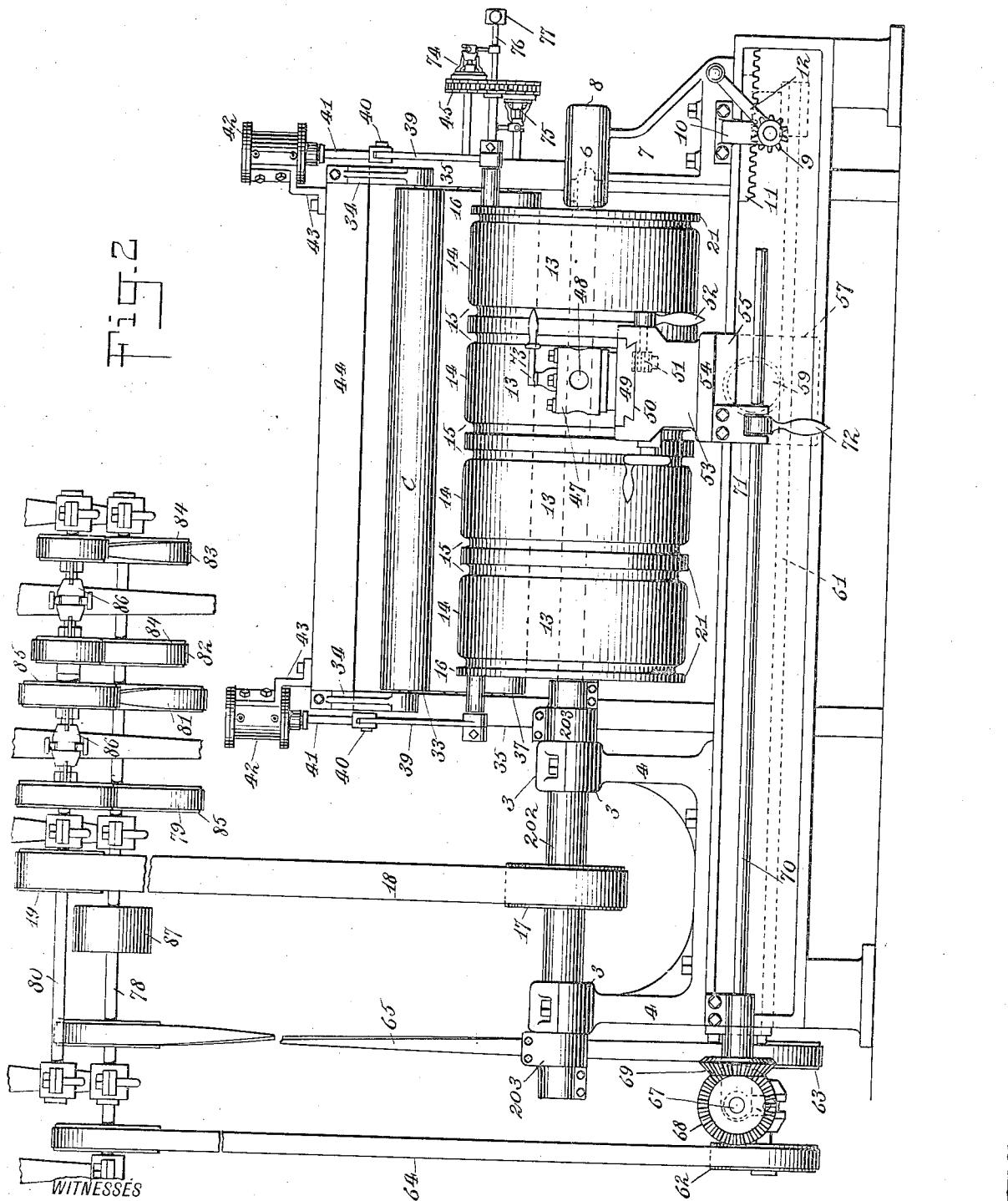

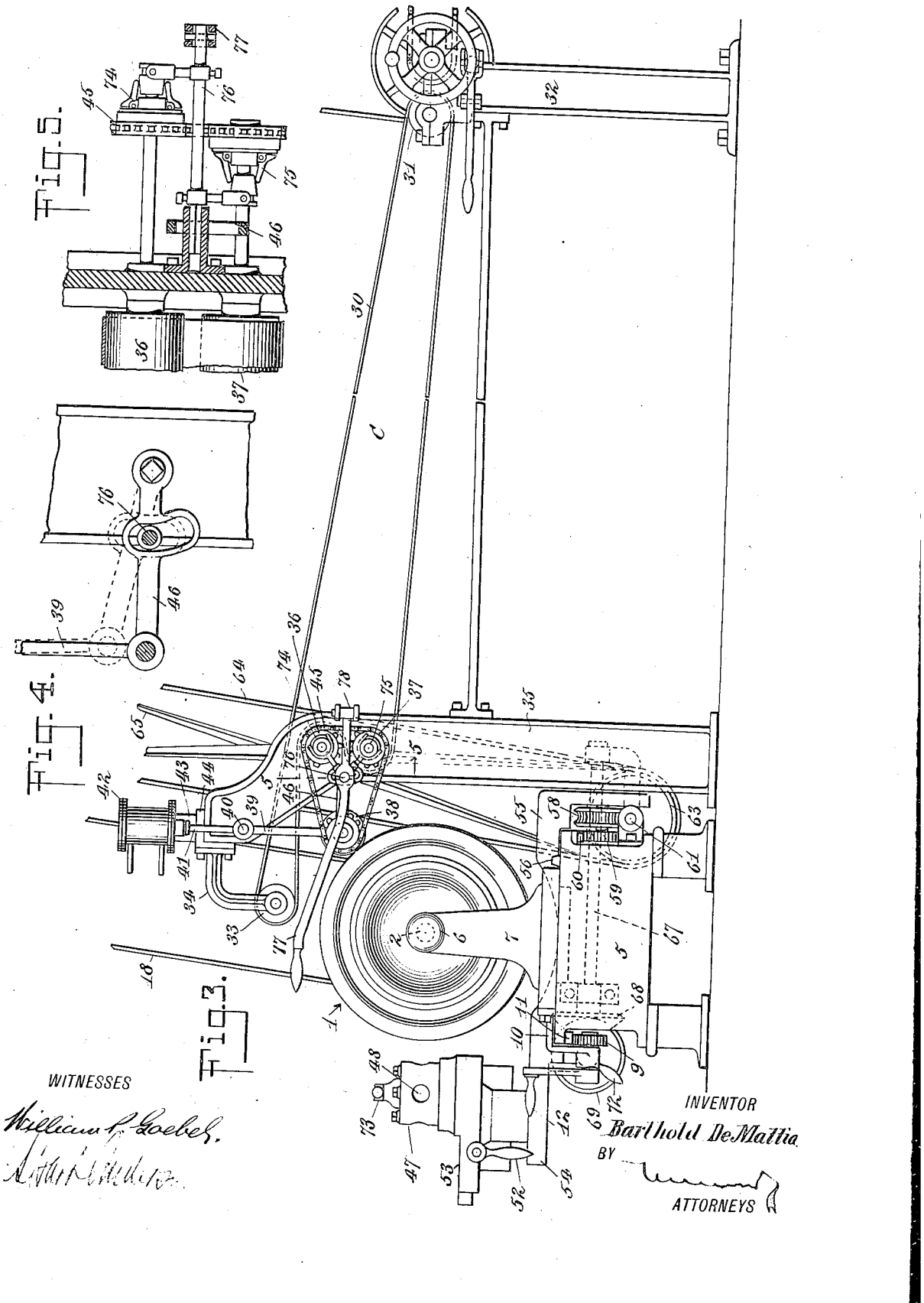

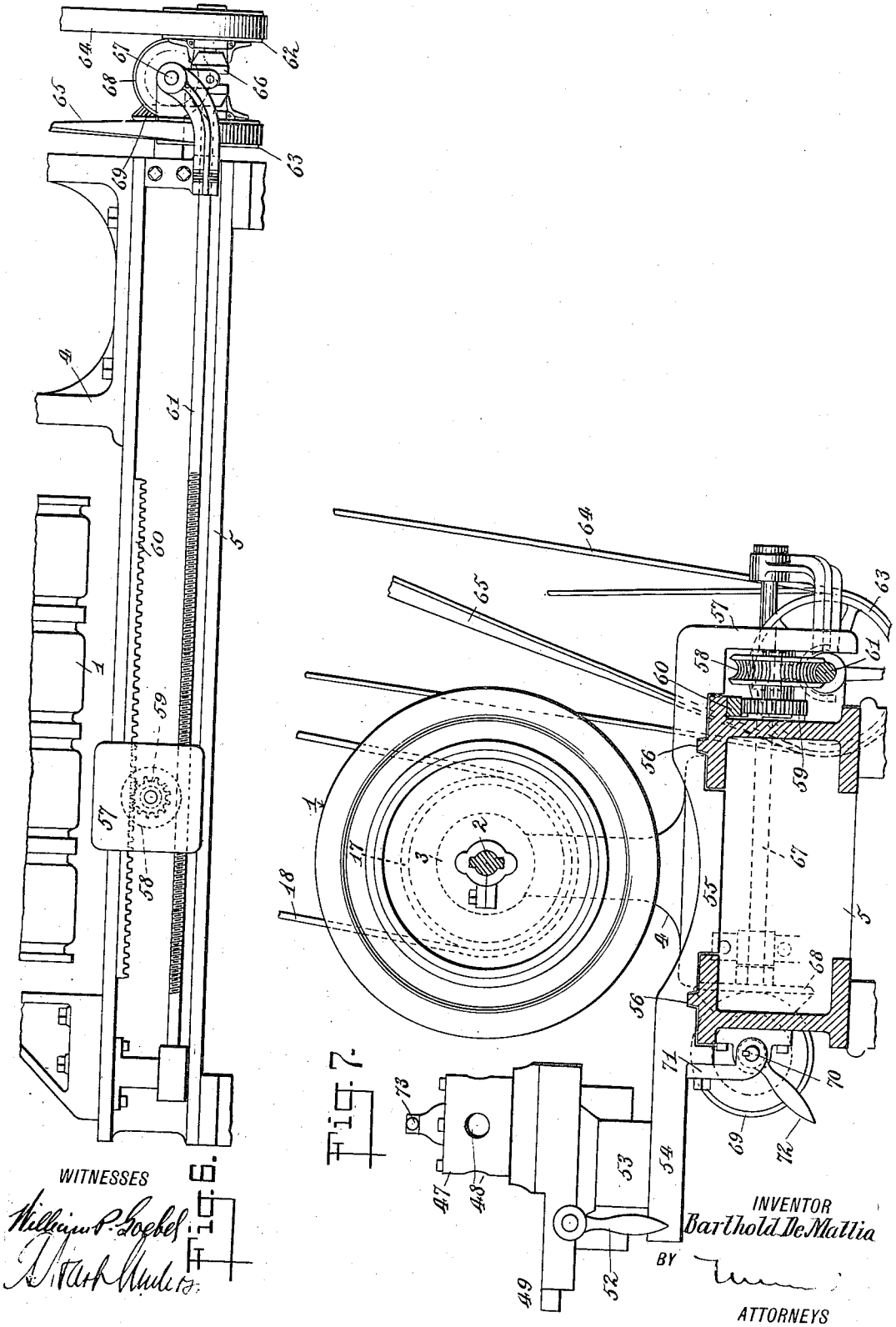

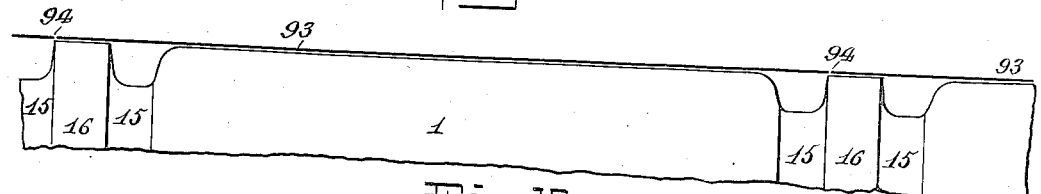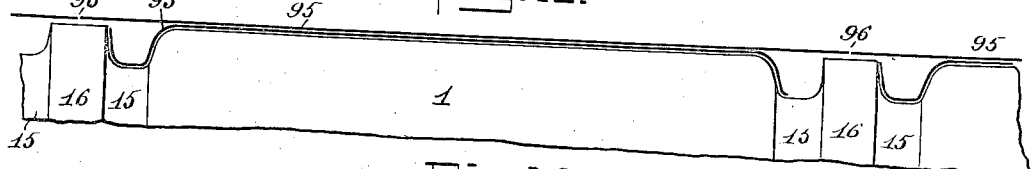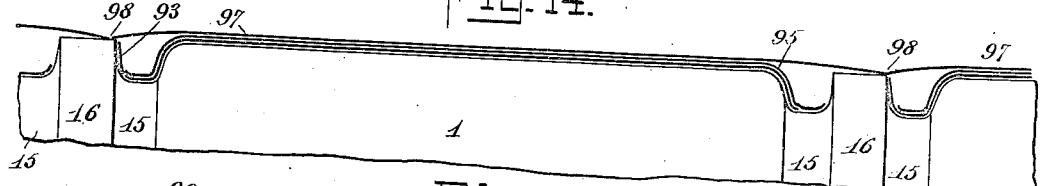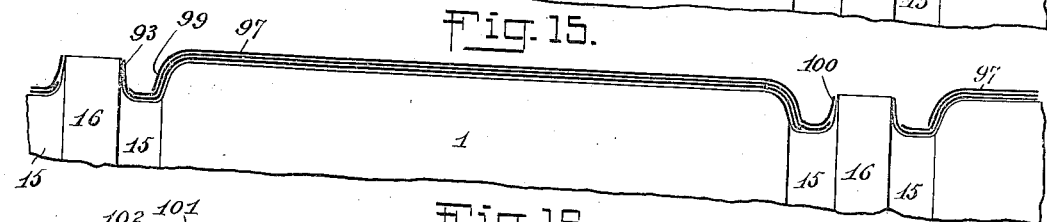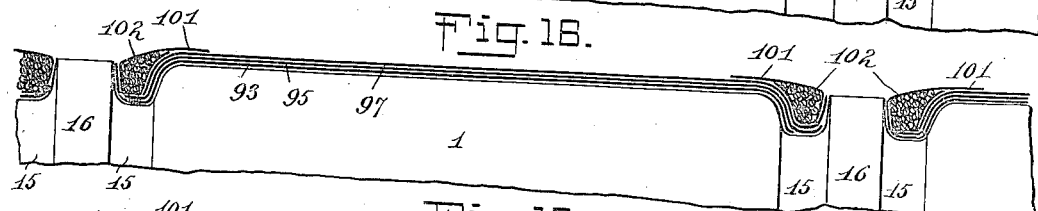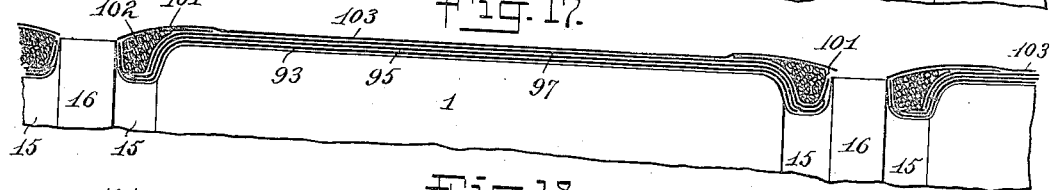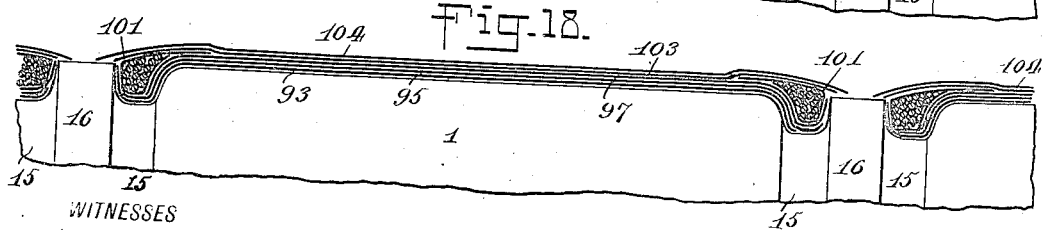

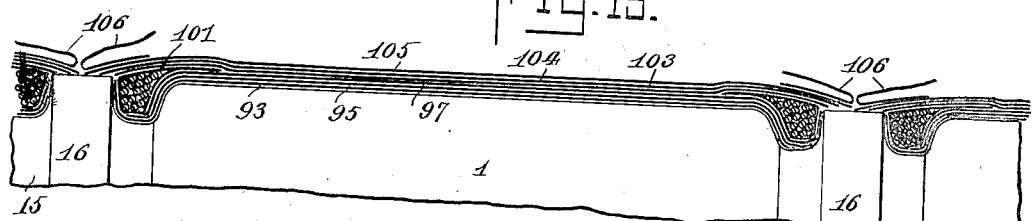
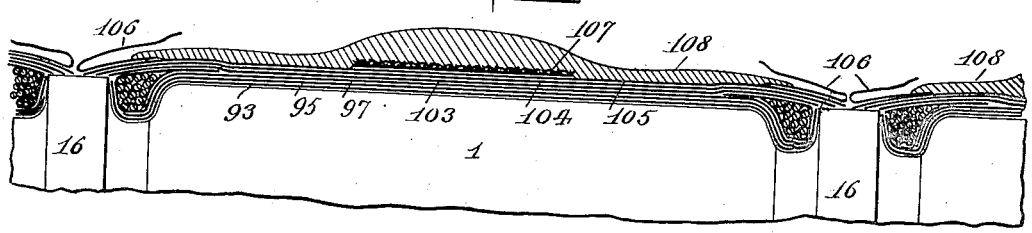
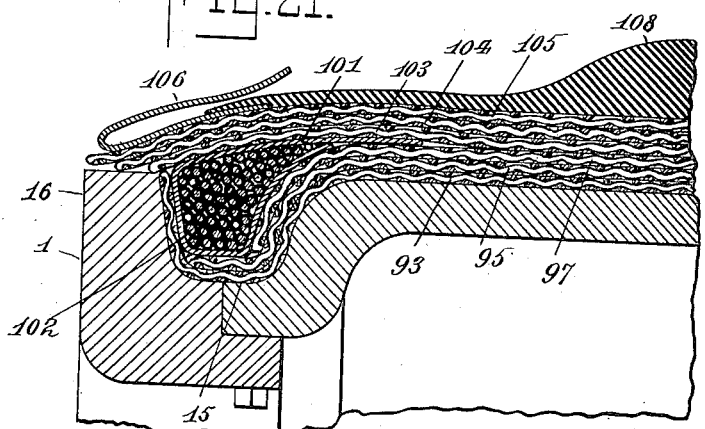
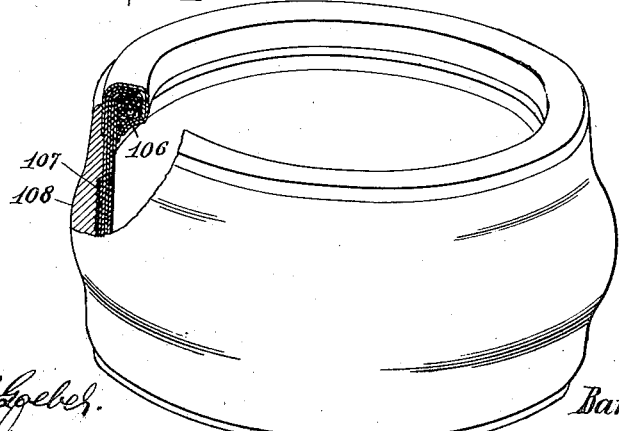

Patented Jan. 16, 1923.

1,442,653

UNITED STATES PATENT OFFICE.

BARTHOLD DE MATTIA, OF CLIFTON, NEW JERSEY.

MACHINE FOR BUILDING CYLINDRICAL TIRE BLANKS.

Application filed March 9, 1920. Serial No. 364,534.

*To all whom it may concern:*

Be it known that I, BARTHOLD DE MATTIA, a citizen of the United States, and a resident of Clifton, in the county of Passaic and State of New Jersey, have invented a new and Improved Machine for Building Cylindrical Tire Blanks, of which the following is a full, clear, and exact description.

The present invention relates to a machine for the manufacture or building up of cylindrical blanks which are to be subsequently formed into tire casings or shoes for pneumatic tires. In the manufacture of casings or shoes for pneumatic tires the carcass is built up of a plurality of superimposed strips of canvas or other woven fabric coated and impregnated with a rubber compound, in which the threads run diagonally across the strip. In a companion application filed of even date herewith, Serial No. 364,533, I have described a machine for producing strips of tire making fabric of the desired length, and in the present application will be described a mechanism for taking such strips of fabric as they come from the machine described in my companion application and wrapping them about a cylinder or drum and so operating upon them as to produce by the use of such strips and a suitable tread strip and other materials which will be described, a plurality of cylindrical tire blanks which will be subsequently expanded, shaped and manipulated to form casings or shoes for pneumatic tires.

An object of the present invention is to produce a machine whereby a cylindrical tire blank comprising a plurality of superimposed layers of rubber coated fabric may be quickly produced, and whereby the bead in the edges of the blank may be quickly formed in what will be practically a jointless bead construction, and whereby also the tread strip may be readily applied to the outer surface of the superimposed layers of fabric and by a more or less automatically operating mechanism to produce simultaneously a plurality of cylindrical tire blanks.

To the above ends the present invention consists of the devices and combination of devices which will be hereinafter described and claimed.

The present invention is illustrated in the accompanying drawings in which—

Figure 1 shows a broken top plan view of the machine, also illustrating in plan view a portion of the machine which produces the sections of bias fabric strips which are to be utilized in the present machine, also showing an intervening conveyor.

Figure 2 shows the machine in broken front elevation together with one form of a suitable driving mechanism.

Figure 3 shows the machine in broken side elevation looking at the right hand side of the machine as shown in Figure 2, also showing portions of the machine for producing the bias fabric strips and the intervening or interconnecting conveyor.

Figure 4 shows a detail of a portion of the controlling mechanism for the cenveyor and pressure roll, on the line 4—4 in Fig. 1.

Figure 5 shows in partial elevation and partial sectional view details of the controlling mechanism for the pressure roll, on the line 5—5 in Fig. 3.

Figure 6 shows a rear elevation of portions of the drum and other parts more particularly illustrating the mechanism for shifting the turret bed.

Figure 7 shows a sectional view taken through the base of the machine with the drum and other parts shown in end elevation.

Figure 8 shows a front elevation and partial section of the double clutch mechanism which is employed at the end of the machine for cutting and producing the bias strips, which in itself forms no part of the present invention.

Figure 9 shows a diagrammatic view of the driving mechanism which is shown at the top of Figure 2.

Figure 10 shows a cross sectional view through the drum, on the line 10—10 in Fig. 11.

Figure 11 shows a diametrical cross section through portions of the drum.

Figure 12 shows in elevation a portion of the drum and illustrating the application of the first layer of fabric after being cut, but before being shaped or "stitched" as the term is used in this art.

Figure 13 is a similar view showing the first layer of fabric after it has been cut and shaped and with the second layer superimposed thereon after being cut, but before being shaped.

Figure 14 is a similar view showing the second layer of fabric after it has been shaped or stitched and a third layer of fabric superimposed thereon after it has been cut, but before being shaped or stitched.

Figure 15 shows a similar view after the third layer of fabric has been shaped or stitched.

Figure 16 shows a similar view after the bead forming rubber coated wire and the "flipper" have been applied.

Figure 17 shows a similar view after the application of another strip has been made covering the flipper and bead forming material.

Figure 18 shows a similar view after the application of another strip.

Figure 19 shows a similar view after another strip and the chafing strips have been applied.

Figure 20 shows a similar view after the cushioning strips and the tread forming strip have been applied.

Figure 21 shows a very much enlarged sectional view of a portion of one of the built-up blanks shown in Figure 20.

Figure 22 shows a perspective view, partially broken away so as to show a transverse section, of the completed cylindrical blank after the removal from the drum, and with the chafing strip wrapped about the bead.

It will of course be understood that in Figures 12 to 21 inclusive the fabric and the partially formed tire blank are supposed to be shown in cross section.

Similar reference characters will be employed throughout the specification and drawings to designate corresponding parts.

The machine of course will comprise a suitable frame or support for the operative parts of sufficient size and shape and made of suitable material to form an effective support and may or may not be exactly as shown in the drawings. The main part of the machine consists of the drum 1 mounted upon a shaft 2, which shaft is fitted in and supported to rotate with a sleeve 202 and held therein by the split collars 203, fitted to the shaft 2 at each side of the bearings 3 at the upper end of the short standards 4 of a frame which is affixed to the upper surface of the bed 5, the split collars 203 holding the shaft from longitudinal movement in the sleeve 202 while permitting it to be adjusted therein to project more or less at its opposite end. The shaft 2 is provided with keys 204, see Figure 10, and supports the drum 1 and its opposite end at the right hand end of the machine, as shown in Figure 2, is arranged to be fitted into a rotary bearing 6 carried by a standard 7 which is movably supported for sliding movement on the upper surface of the bed 5.

The standard 7 is arranged to be moved by means of a pinion 9 supported by downwardly extending brackets 10 of the standard 7 which engages a rack bar 11 formed on the bed 5; the shaft of the pinion 9 being provided with a crank arm 12 by means of which the pinion may be rotated to impart movement to the standard.

The drum 1 is made up of four separate and independent cylindrical sections 13, these sections being duplicates of each other, and on their outer surface comprising a relatively broad and smooth supporting surface 14 bounded by grooves 15 at each end and by flanges 16 at each end outside of the grooves. There are four sections shown in the drum of the drawings, each of which is adapted to assist in the support and formation of the cylindrical tire blank, as the machine of the drawing is intended to produce four complete cylindrical tire blanks at each series of operation. The sleeve 202 carries a pulley 17 which is driven by a belt 18 running from a pulley 19, and thus the drum 1 will be rotated while the fabric from which the tire blanks are formed is being laid about the drum and during the process of cutting and shaping the material from which such tire blanks are formed, as will be described. The sections 13 of the drum are formed separately as shown in Figure 11 and comprises the relatively broad sections 20 and the rings 21, the rings 21 and the edges of the sections 20 being provided with complementary mating joints 22 to assist in maintaining a rigid connection when assembled. The shaft 2 carries a plurality of supports 23 removably fitted thereto, the peripheries of which are provided with seats 24 and with a stop or shoulder 25 along one edge to receive and position the cylindrical flanges 26 formed integrally with the sections 13 which are arranged to fit over and be supported upon the seats 24. The super surface of the flanges 26 is slightly tapered to receive locking rings 27 of such diameter that when the flanges 26 are seated upon the seat 24 and the locking rings 27 driven thereon the sections 13 and the rings 21 will be firmly secured to the supports 23 and to the shaft 2. The supports 23 are splined upon the shaft 2 to turn therewith. The foregoing arrangement is such that when the sections 13 and the rings 21 are locked upon the shaft 2 they form practically a continuous drum the parts of which are firmly locked together and to the shaft 2 to turn therewith as a single structure, but may be removed from the machine and separated into sections each section carrying a tire making blank thereon.

To facilitate the removal of such blanks from the drum as will be hereinafter specifically described, and as shown in Figure 10, the sections 13 are formed in four parts or segments 131 the edges of which meet on the line 132 and the webs 28 of the sections 13 which carry the flanges 26 will be provided with openings 29 so that a suitable tool may be inserted to engage and assist in removing the clamping rings 27.

Looking at Figure 1 of the drawing the chains 110 are the feeding chains leading from the machine which produces the fabric strip sections and the conveyor C is also partially shown in the application, filed of even date herewith, Serial number 364,533, leading from the end of the machine.

The conveyor C will be employed for the reason that it is a convenient way of handling such strips of bias fabric as they come from the cutting machine and for the further reason that the speed of the conveyor may be adjusted to conform not only to the speed of the feed chains 110 which deliver the bias strip sections of fabric thereto, but also may be adjusted to conform to the surface speed of the rotating drum 1.

The conveyor consists of an endless belt 30 which passes about a pulley 31 supported in bearings at the upper end of standards 32 and which also passes over a roller 33 supported in brackets 34 at the front of the machine and at the upper end of the vertical standards 35. From the roller 33 the belt 30 passes backward about a roller 36 and between that roller and the roller 37 about which it passes in a reverse direction, the under run leading back to the pulley 31. A pressure roller 38 is supported by a shaft which is mounted in hangers 39 pivotally connected at 40 to pistons 41 of fluid pressure devices 42 supported by means of brackets 43 at the upper part of the frame or by the cross-head 44. The pressure roller 38 extends across the drum from end to end in position to bear against and apply pressure to the fabric as it is wrapped about the drum in building up the tire blanks. The pressure roller 38 is driven by contact with the drum 1 or the material laid about the drum and in turn drives the conveyor 30, for which purpose the shafts of the rollers 36, 37 and 38 are provided with sprocket wheels surrounded by a chain 45 whereby the roller 38 will positively drive the rollers 36 and 37 and drive the conveyor C. The shaft supporting roller 38 in addition to being supported by the hangers 39 will also be supported in the forward ends of levers 46 whereby to hold the roller 38 in contact with the surface of the drum, while permitting movement thereof to accommodate itself to the varying thickness of the tire blanks in process of formation.

It is intended that the drum 1 shall be driven in reverse directions as required, and as the conveyor C must always be driven in the same direction, no matter which way the drum is rotating, I have provided a double clutch mechanism 74—75 controlled by a lever 77 for shifting the drive of the conveyor C as required, as will be fully explained.

For the purpose of trimming, cutting into tubular sections, and pressing or stitching or otherwise operating upon the layers of fabric wrapped about the drum various tools are required, and as these tools are required to be positioned longitudinally of the drum so as to operate at various points along its surface, for instance at a point corresponding to the location of each groove, mechanism is provided whereby to quickly move the operating tools lengthwise of the drum, also for accurately adjusting the position of the tools with relation to the drum and to successively bring into operative position the various tools of a plurality of tools. For this purpose the machine comprises a rotary turret or tool carrier 47 having sockets 48 to receive a plurality of tools, and this turret is mounted upon a plate 49 sliding in ways 50 toward and from the drum; the sliding motion of the plate 49 being produced by a rack and pinion mechanism 51, see dotted lines, Figure 2, operated by handle 52. The block 53 which supports the turret 47 and the sliding plate 49 is mounted upon the projecting end 54 of a carriage 55, the carriage being supported by a sliding connection 56 upon the upper surface of the base 5. To quickly move the carriage 55 along the upper surface of the base 5 at its rear end it is provided with a down-turned bracket 57 which carries a shaft upon which is mounted a worm gear 58 and a connected pinion 59 the pinion engaging a rack bar 60 on the base 5. The worm gear 58 meshes with a worm shaft 61 which is driven in reverse directions as required by the pulleys 62 and 63 and the direct or straight belt 64 and the cross belt 65, the pulleys 62 and 63 being connected to the shaft 61 alternately as required by means of a double clutch mechanism 66 under the control of the operator. The foregoing arrangement is such that dependent upon which pulley 62 or 63 is clutched to the shaft 61 the said shaft will be rotated in that direction to turn the worm gear 58 and pinion 59 in the direction required to quickly move the carriage 55 and the tool turret back and forth along in front of the drum.

The clutch control for shifting the clutch 66 consists of a shaft 67 carrying at its forward end a beveled gear 68 which meshes with a beveled gear 69 carried by a shaft 70. The shaft 70 passes through a bracket 71 depending from the carriage 55 and engaging the shaft 70 at each side of a handle 72 immediately below the tool carriage in position convenient to the operator and whereby he may quickly shift the clutch 66 to cause a movement of the tool carriage in either direction parallel to the surface of the drum. It will be understood of course that the turret 47 may be revolved to bring any of the tools supported by and radially projecting from the sockets 48 into operative position and may be locked in that position by means of the locking device 73.

The sprocket wheels 45 are arranged to be connected alternately to their respective shafts by means of suitable reverse clutch devices 74 and 75 controlled by a sliding rod 76 which is arranged to be shifted by means of a lever 77 pivotally connected at 78 and extending forward as shown in Figures 1 and 3 whereby either clutch may be connected to drive the conveyor always in the same direction no matter which direction the pressure roller may be driven in. At the top of Figures 1 and 2 and in Figures 8 and 9 is shown a form of driving mechanism designed not only to move certain of the operating parts in reverse directions as required, but to move them at a high or low speed as required and this mechanism as shown consists of a main shaft 78 carrying suitable pulleys about which the belts 64 and 65 pass and from which they are driven. This main shaft 78 by means of a belt 79 drives a counter shaft 80 which carries a pulley 19 driving the belt 18. The counter shaft 80 is driven by the belt 79 and the cross belt 81 at one speed and by the belts 82 and 83 at a different speed, the belts 82 and 83 engaging pulleys 84 of less diameter than the pulleys 85 of the belts 79 and 81. Each of the groups of pulleys 84 and 85 are loose on the shaft 80 and arranged to be connected thereto by clutch devices 86 under the control of the operator. The shaft 78 also carries a driving pulley 87. The pulley 88 is loosely connected to the shaft 89 of the machine for cutting and feeding the fabric which forms the subject matter of the companion application herein before referred to, a portion of which is shown in Figure 1 of the drawing of the present case, and a double clutch mechanism 90 and 91 under the control of the operator by means of a lever 92 (see Figure 1) may be operated to alternately cause the pulley 88 either to drive the intermediate feed chains of the cutting machine (not shown) by means of the chain 901 or the feed chains 110 of that machine and the conveyor C or when placed in a neutral position to permit the conveyor C to be driven by the pressure roller 38.

The driving and controlling devices as described may be of any other design or form than that shown suitable for the purpose of producing synchronous speed and the required direction of movement in the various instrumentalities operated thereby to cause that movement of the parts and more particularly the drum, at such speed and in such direction as may be required to facilitate the delivery of the tire making material to the drum, the wrapping of the material about the drum, and the operation of the tools thereon to produce cylindrical tire forming blanks in a manner which will now be described.

Assuming that the conveyor C has received from the fabric cutting machine a strip of fabric and that it is moving at a speed corresponding to the surface speed of the drum, it will advance this strip of fabric to a point where it passes off the conveyor and will be led by the operator to the surface of the drum and wrapped about the same and pressed smoothly thereon by the pressure roller 38. This strip of fabric extends from end to end of the drum and is of a length sufficient to form one layer of a plurality of separate and distinct tire blanks. Figure 12 shows the first layer of fabric 93 laid upon the drum and before cutting. After this strip has been laid upon the drum as shown in Figure 12 all parts of the machine with the exception of the drum are stopped, the clutches being thrown into a neutral position and the pressure roller raised if desired. The tool turret is now positioned so that a cutter is brought into action so as to sever the strip of fabric 93 at each end so that it will correspond in width to the length of the drum from end to end and it is also severed at intermediate points to cut the tube into four sections, the line of cut at the intermediate points being at the outer edge of the right hand groove in each section of the drum as shown at 94. After the first layer of fabric has been been severed as described the tool carriage is brought back to its starting point and the appropriate stitching or forming tool is brought opposite the grooves 15 successively and the ends of each cylindrical section of the first layer of fabric 93 are pressed and forced into the grooves 15 as shown in Figure 13, and because of the position of the cuts 94 with relation to the grooves the end of the first layer of fabric will be positioned in the grooves as shown in Figure 13, that is to say at one end it will entirely cover the surface of the groove and extend upwardly to a point substantially coincident with the surface of the ring 16, whereas at the other end it will cover substantially the inner or left hand surface of the groove extending only to the bottom of the groove.

After the first layer 93 has been shaped to the grooves as described a second layer 95 is laid about the drum and closely pressed to the surface of the layer 93. This layer will be wrapped about the drum in a direction opposite to the first layer, that is to say, assuming that the drum is revolving from right to left in Figure 3 when the first layer was delivered to the drum, it will be revolved from left to right when the second layer is applied and accordingly the leading end of the second layer as it passes from the conveyor belt 30 over the roller 33 will be led backward beneath the pressure roller 38 and this will be the manner of applying successive layers. The second layer 95 is now cut at each end to correspond to the length of the drum and at intermediate points and preferably the intermediate cuts will be at points corresponding to the central line of the flat surface of the rings 16 as shown at 96 in Figure 13. Having been cut the shaping tool is brought into position and forces the ends of the layer 95 into the grooves as shown in Figure 14 extending downward along the inner surface of the grooves and partially across the base of the grooves. After the second layer 95 has been applied and shaped to the grooves a third layer 97 is applied, and it is cut as shown in Figure 14 on lines coinciding with the right hand edges of the flat surfaces of the rings 16 as indicated at 98 in Figure 14. After being cut the ends of the tubular section 97 are pressed and stitched into the grooves and of course as one end is shorter than the other it will at one end cover the entire surface of the groove and at the other only a part of such surface as indicated at 99 and 100, in Figure 15. After a sufficient number of layers have been laid about the drum and cut up and stitched as described the bead forming material is now applied which consists of a flipper strip 101 laid about and forced into each groove after which a rubber coated wire 102 is wound about and packed closely in each groove as shown in Figures 16 to 18 of the drawing forming an endless bead for the tire blank and tire. After the wire bead forming material which is coated with rubber has been applied to fill up the grooves, as shown, the flipper strip 101 is laid over to cover the bead forming material and stitched to the upper surface of the layer 97. Thereafter a fourth layer of fabric 103 and a fifth layer of fabric 104 and a sixth layer of fabric 105 are wrapped about, pressed upon and secured to the preceding layers and properly cut and manipulated as required to produce a close union. Thereafter a suitable chafing strip 106 is applied at each end and cushion strips 107 and a previously prepared tread strip 108 are applied to each cylindrical section as shown in Figures 19 to 21 inclusive, during all of which operations the application of the various chafing strips, cushioning strips and tread strips to the entire structure is facilitated and accomplished by the rotation of the drum and by the application thereto of the appropriate tools necessary for the purpose carried by the tool carriage.

As shown in Figure 21 the cylindrical blank has been completed in so far as it is built up and constructed in the present machine whereupon by releasing the end of the shaft 2 by moving the carriage 7 to the right as shown in Figure 2 the sections of the drum will be removed from the machine, and in order to remove the tire sections from the drum the drum is dismantled by releasing the locking rings 27 which permits the sections to be collapsed and separated and removed from the castings 23, thus permitting the removal of the cylindrical tire sections. Having removed the tire sections the chafing strip 106 will be turned inwardly as well as the ends of the layers projecting beyond the bead and secured to the inner surface of the cylindrical blank as shown in Figure 22. This completes the product as it comes from this machine.

I claim:

1. In a machine of the class described, in combination, a rotary drum, a conveyor to deliver a strip of fabric to said drum to be wrapped about said drum, a pressure roller to press the fabric to said drum while it is being wrapped about said drum and connecting mechanisms under the control of the operator to drive the drum and pressure roller at a uniform speed and in opposite directions as required without changing the direction of movement of the conveyor.

2. In a machine of the class described, in combination, a rotary drum, means to apply tire forming fabric thereto in separate superimposed layers and means to operate upon said layers of fabric to form a plurality of separate cylindrical tire blanks.

3. In a machine of the class described, in combination, a rotary drum comprising a plurality of annular sections, a supporting shaft, means for detachably mounting such sections upon the shaft and annular rings interposed between and engaging adjacent annular sections.

4. In a machine of the class described, in combination, a rotary drum comprising a plurality of annular sections and independent annular rings, a shaft and means to lock the sections and rings upon the shaft in close relation to each other so that the outer surface of the drum forms a plurality of independent tire blank forming surfaces.

5. In a machine of the class described, in combination, means for forming layers of fabric in cylindrical form and means for separating the same into a plurality of independent cylindrical tire blanks as the layers are applied.

6. In a machine of the class described, in combination, a rotary drum, means to deliver layers of fabric thereto to form a cylindrical tire blank and spaced grooves on the surface of the drum for receiving the bead forming material of such tire blank.

7. In a machine of the class described, in combination, a rotary drum formed of independent annular sections having the opposite edges reduced in diameter, independent rings co-operating therewith to form annular grooves on the surface of the drum at the opposite ends of each annular section and means to detachably connect the annular sections and rings in close relation to each other to form a drum.

8. In a machine of the class described, in combination, a rotary drum, a pressure roller, means to press said roller against said drum, a conveyor operated by said pressure roller and means to reverse the movement of said drum and pressure roller without changing the direction of travel of the conveyor.

9. In a machine of the class described, in combination, a rotary drum comprising a plurality of annular sections, a locking ring positioned between adjacent sections, a shaft and a plurality of supports removably fitted to said shaft upon which the annular sections are mounted.

10. In a machine of the class described, in combination, a rotary drum comprising a plurality of annular sections, a pressure roller rotated by said drum, a tool carrier movable from end to end of the drum, a worm gear carried by the tool carrier, a worm shaft co-operating with the worm gear, means to rotate said shaft, and means under the control of the operator to reverse the directions of rotation.

11. In a machine of the class described, in combination, a frame, a rotary drum, a shaft, standards supporting said shaft, one of said standards being movably supported by said frame, and means under the control of the operator for moving said standard towards and away from said drum.

BARTHOLD DE MATTIA.